(12) United States Patent
Nishikawa (10) Patent No.: US 8,559,031 B2
(45) Date of Patent: Oct. 15, 2013

(54) IMAGE FORMING SYSTEM RESTRICTING EXECUTION OF ACQUISITION PROCESS

(75) Inventor: Naoki Nishikawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 571 days.

(21) Appl. No.: 12/882,177

(22) Filed: Sep. 14, 2010

(65) Prior Publication Data
US 2011/0157625 A1    Jun. 30, 2011

(30) Foreign Application Priority Data

Dec. 25, 2009  (JP) .................................. 2009-293754
Aug. 16, 2010  (JP) .................................. 2010-181668

(51) Int. Cl.
*G06K 15/00* (2006.01)

(52) U.S. Cl.
USPC ............. 358/1.14; 358/1.2; 358/1.4; 358/1.9; 358/1.13; 358/1.15; 358/1.16; 358/1.18; 358/504

(58) Field of Classification Search
None
See application file for complete search history.

(56) References Cited

U.S. PATENT DOCUMENTS

| | | | |
|---|---|---|---|
| 7,161,718 B2 | 1/2007 | Kise | |
| 7,224,919 B1 * | 5/2007 | Shemirani et al. | 399/72 |
| 2004/0001215 A1 * | 1/2004 | Kurotsu | 358/1.13 |
| 2007/0070460 A1 * | 3/2007 | Yamada | 358/504 |
| 2007/0097449 A1 * | 5/2007 | Shibata | 358/406 |
| 2008/0088891 A1 | 4/2008 | Shiraishi | |
| 2011/0157624 A1 | 6/2011 | Nishikawa | |

FOREIGN PATENT DOCUMENTS

| | | |
|---|---|---|
| JP | 2001-013753 A | 1/2001 |
| JP | 2002-296984 A | 10/2002 |
| JP | 2002-297358 A | 10/2002 |
| JP | 2003-149905 A | 5/2003 |
| JP | 2005-221760 A | 8/2005 |
| JP | 2006-074394 A | 3/2006 |
| JP | 2006-163052 A | 6/2006 |
| JP | 2007-058284 A | 3/2007 |
| JP | 2007-140570 A | 6/2007 |
| JP | 2008-096662 A | 4/2008 |

OTHER PUBLICATIONS

Japan Patent Office, Office Action for Japanese Patent Application No. 2009-293771 (counterpart Japanese patent application), mailed Dec. 4, 2012.

* cited by examiner

*Primary Examiner* — Miya J Cato (74) *Attorney, Agent, or Firm* — Baker Botts L.L.P.

(57) ABSTRACT

In an image-forming system, the first determining unit is configured to determine whether at least one image-forming device among the plurality of image-forming device is capable of performing the image print process. The second determining unit is configured to determine whether to restrict an image-forming device among the plurality of image-forming devices to execute the test print process based on a result of determination by the first determining unit. The restricting unit is configured to restrict the image-forming device to execute the test print process when the second determining unit determines to restrict the image-forming device to execute the test print process.

9 Claims, 9 Drawing Sheets

IMAGE FORMING SYSTEM RESTRICTING EXECUTION OF ACQUISITION PROCESS

CROSS REFERENCE TO RELATED APPLICATION

This application claims priorities from Japanese Patent Application No. 2009-293754 filed Dec. 25, 2009 and Japanese Patent Application No. 2010-181668 filed Aug. 16, 2010. The entire contents of the priority applications are incorporated herein by reference.

TECHNICAL FIELD

The invention relates to an image-forming device that forms positioning marks for adjusting images, and an image-forming system configured of a plurality of such image-forming devices.

BACKGROUND

There are known conventional image-forming devices that adjust images so that there are no deviations in positions or densities of images formed on a recording medium. For example, procedures for adjusting images include: to form a registration pattern in each color to be used for adjusting the image positions; to acquire an amount of offset (a correction value) between the registration pattern formed in a reference color and each of the registrations patterns formed in target colors; and to correct the position of the images in the target colors based on these correction values.

Here, there is a known problem that time required to acquire the correction values may lead to a decline in printing efficiency. To this effect, Japanese patent application publication No. 2001-013753 discloses a technology to reduce copy time by canceling the process to acquire correction values.

SUMMARY

However, the following problem is inherent in the conventional image-forming device described above. Specifically, the acquisition timing for acquiring the correction values is determined according to circumstances of the image-forming device itself, such as the time that has elapsed or the number of sheets that have been printed since the previous acquisition process. In other words, operating conditions of other image-forming devices are not considered when determining the acquisition timing for acquiring correction values. Consequently, when multiple image-forming devices constituting an image-forming system perform an operation to acquire correction values simultaneously, a user of the system is not able to use any of the image-forming devices.

In view of the foregoing, it is an object of the invention to provide an image-forming device and an image-forming system capable executing image adjustment after learning the operating conditions of other image-forming devices.

In order to attain the above and other objects, the invention provides an image-forming system. The image-forming system includes a plurality of image-forming devices, a first determining unit, a second determining unit, and a restricting unit. The plurality of image-forming devices are connected in a network. Each image-forming device is selectively capable of performing a test print process to form a test image and an image print process to form an image based on image data. The first determining unit is configured to determine whether at least one image-forming device among the plurality of image-forming device is capable of performing the image print process. The second determining unit is configured to determine whether to restrict an image-forming device among the plurality of image-forming devices to execute the test print process based on a result of determination by the first determining unit. The restricting unit is configured to restrict the image-forming device to execute the test print process when the second determining unit determines to restrict the image-forming device to execute the test print process.

According to another aspect, the present invention provides an image-forming device. The image-forming device includes an executing unit, a first determining unit, a second determining unit, and a restricting unit. The executing unit is selectively capable of performing a test print process to form a test image and an image print process to form an image based on image data. The first determining unit is configured to determine whether an external image-forming device is capable of performing an image print process. The second determining unit is configured to determine whether to restrict the executing unit to execute the test print process based on a result of determination by the first determining unit. The restricting unit is configured to restrict the executing unit to execute the test print process when the second determining unit determines to restrict the executing unit to execute the test print process.

BRIEF DESCRIPTION OF THE DRAWINGS

The particular features and advantages of the invention as well as other objects will become apparent from the following description taken in connection with the accompanying drawings, in which.

DETAILED DESCRIPTION

First Embodiment

An image-forming system 500 according to a first embodiment of the invention will be described with reference to FIGS. 1 through 7.

Figure 1:
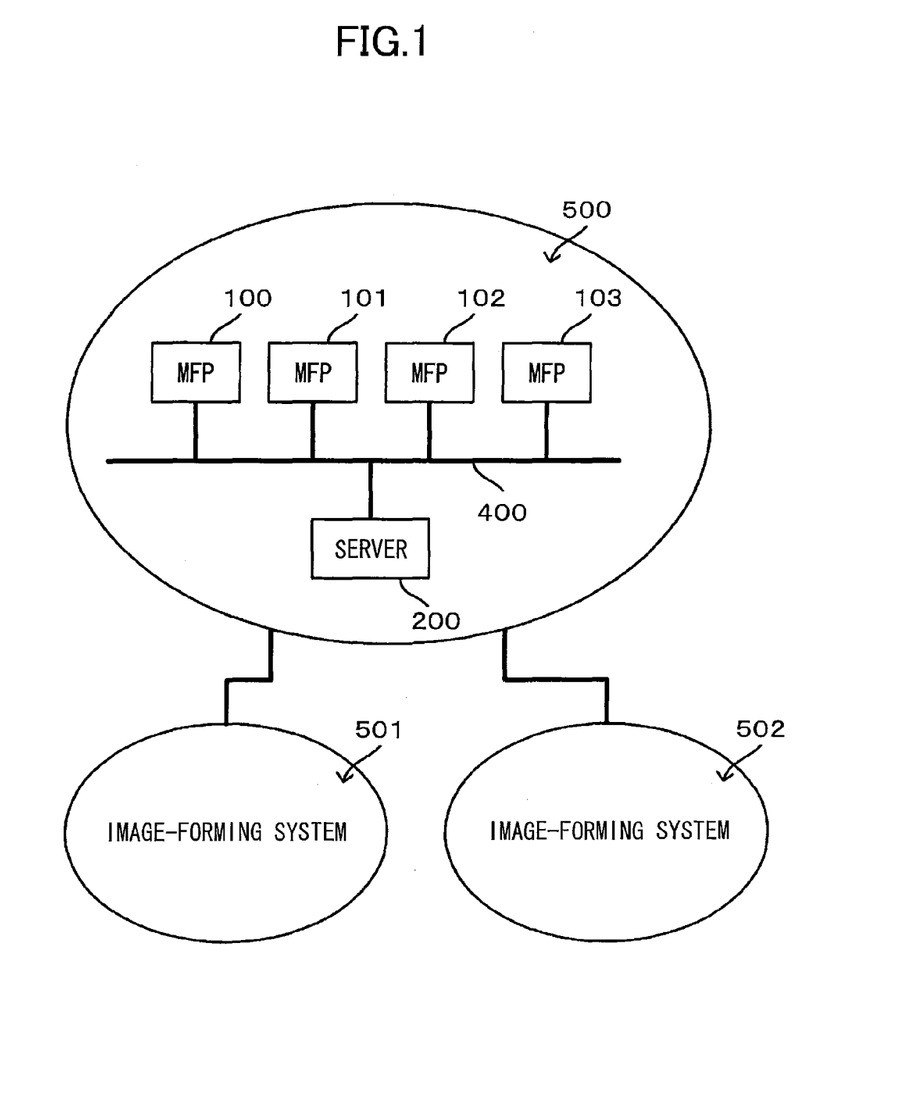
FIG. 1 is a conceptual diagram showing a configuration of an image-forming system according to a first embodiment of the invention.

First, an overall configuration of the image-forming system 500 will be described with reference to FIG. 1. As shown in FIG. 1, the image-forming system 500 includes a plurality of multifunction peripherals (MFPs) 100, 101, 102 and 103, each of which has a color printing function; and a server 200 for controlling the MFPs 100, 101, 102 and 103 belonging to the image-forming system 500. The MFPs 100, 101, 102 and 103 and the server 200 are all connected to a network 400.

The number of image forming devices (other MFPs, as well as printers, and copiers) belonging to the image-forming system 500 may be arbitrary. In addition, other data processors (personal computers, for example) may be connected to the network 400. The image-forming system 500 is also connected to other image-forming systems 501 and 502 via an internet or other network.

Figure 2:
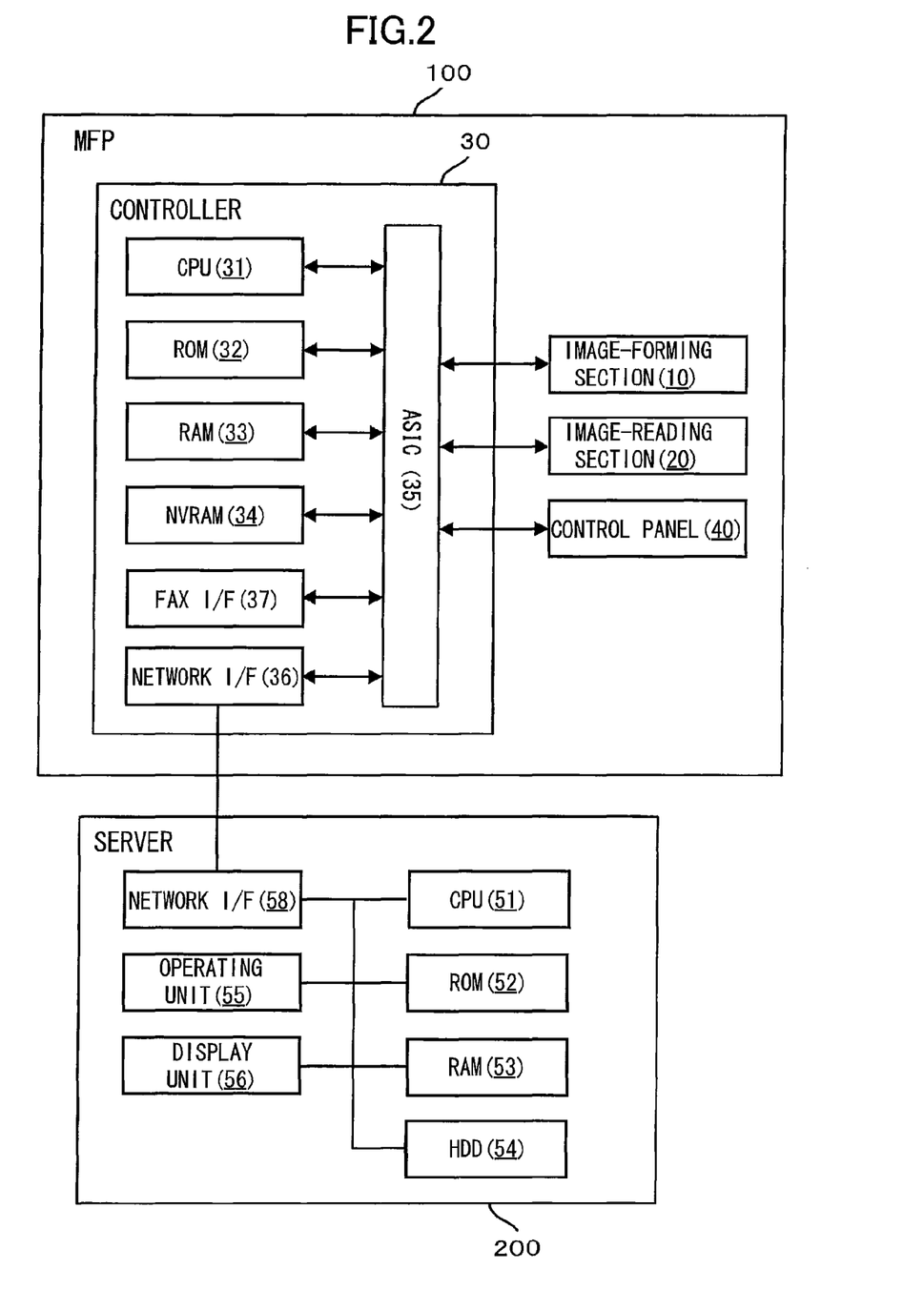
FIG. 2 is a block diagram illustrating electrical configurations of an MFP and a server of the image-forming system according to the first embodiment.

Next, general structures of the MFP 100 and the server 200 will be described with reference to FIG. 2. As shown in FIG. 2, the MFP 100 includes a controller 30, an image-forming section 10, an image-reading section 20 and a control panel 40. The controller 30 is electrically connected to the image-forming section 10, the image-reading section 20 and the control panel 40. The MFPs 101, 102 and 103 have a similar structure to the MFP 100.

The controller 30 has a CPU 31, a ROM 32, a RAM 33, an NVRAM (nonvolatile RAM) 34, an ASIC (application-specific integrated circuit) 35, a network interface 36 and a fax interface 37. The ROM 32 stores various control programs for controlling the MFP 100 and various settings, and initial values. Specifically, the ROM 32 stores a program used when executing an acquisition execution process. The RAM 33 is used as a work area in which the various control programs are loaded, or as a storage area for temporarily storing image data.

The CPU 31 controls various components of the MFP 100 via the ASIC 35 based on processes executed by the control programs read from the ROM 32 and signals received from various sensors while storing the results of processes in the RAM 33 or the NVRAM 34.

The network interface 36 is connected to the network 400 for allowing communications with the server 200 and the like. The fax interface 37 is connected to a telephone network for allowing communications with a destination facsimile machine. The MFP 100 is capable of exchanging data with an external device via the network interface 36 and the fax interface 37.

The image-forming section 10 forms images on paper and the image-reading section 20 reads images from original documents. The control panel 40 accepts user-input operations and displays operating status of the MFP 100.

As also shown in FIG. 2, the server 200 includes a CPU 51; a ROM 52; a RAM 53; a hard disk drive (HDD) 54; an operating unit 55 configured of a keyboard, mouse, and the like; a display unit 56 configured of a liquid crystal display or the like; and a network interface 58.

An operating system (OS), device drivers for controlling various devices, and application programs are installed on the HDD 54 of the server 200. In particular, a control program that is used when executing an acquisition control process for controlling the MFPs 100, 101, 102 and 103 belonging to the image-forming system 500 is installed on the server 200.

Next, a general structure of the image-forming section 10 in the MFP 100 will be described with reference to FIG. 3. The image-forming section provided in each of the MFPs 101, 102 and 103 has a similar structure to the image-forming section 10 provided in the MFP 100.

Figure 3:
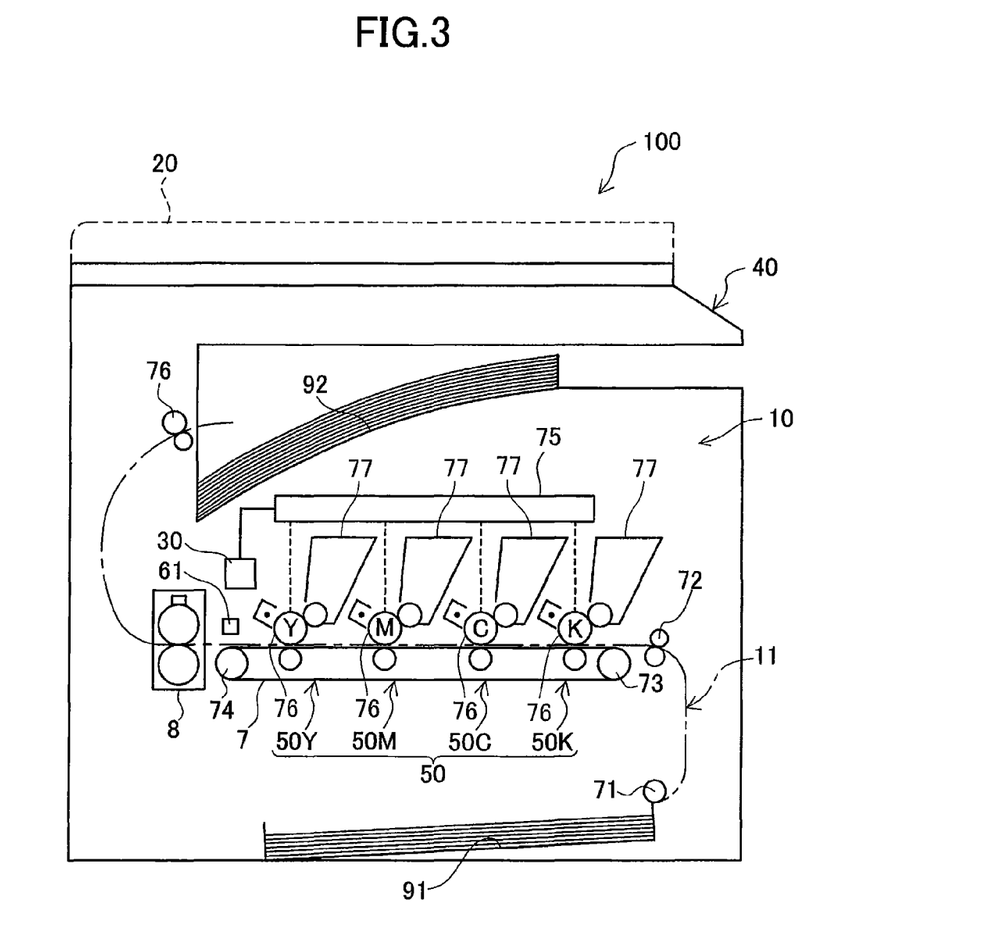
FIG. 3 is a conceptual diagram showing a general configuration of an image-forming section of the MFP according to the first embodiment.

As shown in FIG. 3, the image-forming section 10 includes a process section 50 for forming toner images according to an electrophotographic system and for transferring these toner images onto paper; a fixing unit 8 for fixing the transferred toner images to the paper; a paper tray 91 accommodating sheets of paper on which images have not yet been transferred; and a discharge tray 92 for retaining sheets of paper after images have been transferred thereon. The image-reading section 20 is disposed in the MFP 100 above the image-forming section 10.

A substantially S-shaped paper-conveying path 11 indicated by a chain line in FIG. 3 is formed inside the image-forming section 10. As shown in FIG. 3, the paper-conveying path 11 extends from one end of the paper tray 91 disposed in the bottom of the MFP 100 (an upstream end) to a point near the discharge tray 92 formed on the top of the image-forming section 10 (a downstream end). A direction in which the sheet is conveyed from the upstream end and downstream end along the paper-conveying path 11 is referred to as a sheet-conveying direction. The image-forming section 10 also accommodates a pickup roller 71 disposed at the upstream end of the paper-conveying path 11 above the corresponding end of the paper tray 91, a pair of registration rollers 72 disposed upstream of the process section 50 in the sheet-conveying direction, and a pair of discharge rollers 76 disposed near the downstream end of the paper-conveying path 11. The pickup roller 71 picks up the sheets of paper accommodated in the paper tray 91 and feeds the sheets in the sheet-conveying direction to the registration rollers 72, which convey the sheets through the process section 50 and the fixing unit 8 to the discharge rollers 76. The discharge rollers 76 discharge the sheets onto the discharge tray 92.

The process section 50 is capable of forming color images on the sheets of paper. Specifically, the process section 50 includes process sections corresponding to each of the colors yellow (Y), magenta (M), cyan (C), and black (K) juxtaposed horizontally and parallel to one another. The process section 50 specifically includes a process section 50Y for forming images in the color yellow, a process section 50M for forming images in the color magenta, a process section 50C for forming images in the color cyan, and a process section 50K for forming images in the color black. The process sections 50Y, 50M, 50C, and 50K are disposed at fixed intervals in the sheet-conveying direction.

The image-forming section 10 also includes an exposure device 75 for irradiating light onto each of the process sections 50Y, 50M, 50C, and 50K; a conveying belt 7 for conveying the sheets of paper to transfer positions in each of the process sections 50Y, 50M, 50C, and 50K; and mark sensors 61 for detecting registration patterns formed on the conveying belt 7.

The process section 50 is provided with photosensitive members 76 for each of the corresponding colors, chargers for applying a uniform charge to surfaces of the corresponding photosensitive members 76 and developing devices 77. The charged surfaces of the photosensitive members are then exposed to light emitted from the exposure device 75 to form electrostatic latent images on the photosensitive members 76 corresponding to the images to be formed on paper. The developing devices 77 supply toner onto the photosensitive members 76, developing the electrostatic latent images carried on the photosensitive members into visible toner images.

The conveying belt 7 is an endless belt member that is mounted over conveying rollers 73 and 74 disposed therewithin. The conveying belt 7 is formed of a synthetic resin material such as polycarbonate. When the conveying roller 74 is driven to rotate, the conveying belt 7 circulates in a counterclockwise direction of FIG. 3. Consequently, each sheet of paper conveyed onto the conveying belt 7 is conveyed from the registration rollers 72 side of the conveying belt 7 to the fixing unit 8 side.

With this construction, the image-forming section 10 picks up one sheet of paper at a time from the paper tray 91 and conveys this sheet of paper onto the conveying belt 7. Toner images formed in the process section 50 are subsequently transferred onto the sheet of paper. At this time, in a color printing operation, toner images formed in each of the process sections 50Y, 50M, 50C, and 50K are transferred to and superimposed on the sheet of paper. In black-and-white printing, on the other hand, a toner image is formed only in the process section 50K and transferred onto the sheet of paper. After the toner images have been transferred onto the sheet of paper, the sheet is conveyed to the fixing unit 8 at which the toner images are thermally fixed to the sheet. Subsequently, the sheet is discharged onto the discharge tray 92.

The mark sensors 61 are positioned downstream of the process sections 50Y, 50M, 50C, and 50K in the sheet-conveying direction, but upstream of the fixing unit 8. The mark sensors 61 serve to detect registration patterns that have been formed on the conveying belt 7.

Figure 4:
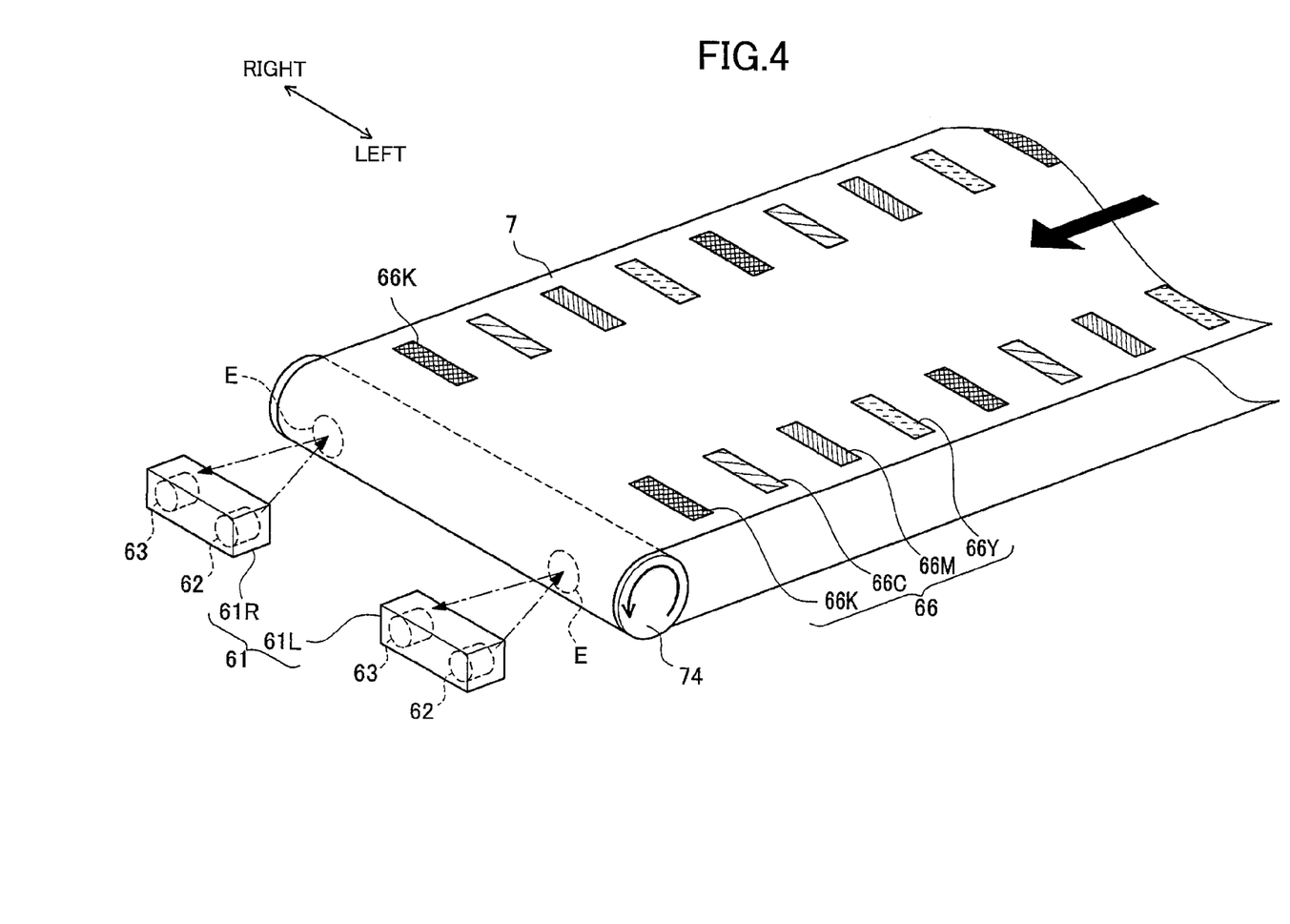
FIG. 4 is a conceptual view showing arrangement of mark sensors of the MFP shown in FIG. 3.

As shown in FIG. 4, the mark sensors 61 include a right sensor 61R and a left sensor 61L. The right sensor 61R is disposed on a widthwise right side of the conveying belt 7, while the left sensor 61L is disposed on a widthwise left side of the conveying belt 7. Each of the sensors 61R and 61L is a reflective photosensor that includes a light-emitting element 62 (an LED, for example) and a light-receiving element 63 (a phototransistor, for example) as a pair. With the mark sensors 61 having this construction, each light-emitting element 62 emits light so as to irradiate the surface of the conveying belt 7 at an oblique angle within a corresponding region E enclosed by a dashed line in FIG. 4, and the corresponding light-receiving element 63 receives the light reflected off the surface of the conveying belt 7. The mark sensors 61 can detect registration patterns 66 (to be described next) formed on the surface of the conveying belt 7 when the registration patterns 66 pass through the regions E based on differences in amounts of reflected light detected by the light-receiving elements 63 when the light passes through each registration pattern 66 and when the light is directly reflected off the conveying belt 7.

Next, a process performed on the MFP 100 to correct registration offset will be briefly described. Registration correction is a process performed to adjust the positions of images formed in each color. The registration correction process is divided into an acquisition process for acquiring an amount of offset for each color relative to a reference color, and a correction process for correcting the position of the image for each color based on the corresponding offset. The acquisition process is performed when a predefined condition for execution has been met. For example, the condition for execution may be determined according to the amount of elapsed time or the number of pages printed since the previous acquisition process, a change in ambient conditions such as temperature or humidity, or the amount of residual toner. The correction process is executed for each printing operation. The acquisition process, and not the correction process, will be described herein.

At the beginning of the acquisition process, each of the process sections 50Y, 50M, 50C, and 50K forms registration patterns 66 on the surface of the conveying belt 7. The registration pattern 66 is an image used for registration correction. Specifically, as shown in FIG. 4, the registration pattern 66 is a group of marks juxtaposed in a subscanning direction (the direction in which the conveying belt 7 moves, as indicated by a solid arrow in FIG. 4). More specifically, each registration pattern 66, in this example shown in FIG. 4, includes a single mark 66K formed by the process section 50K, a single mark 66Y formed by the process section 50Y, a single mark 66M formed by the process section 50M, and a single mark 66C formed by the process section 50C.

The registration patterns 66 are formed at fixed intervals in the subscanning direction. Each of the marks 66K, 66Y, 66M, and 66C in the first embodiment is formed in a rectangular bar-shape elongated in a main scanning direction orthogonal to the subscanning direction.

The MFP 100 detects the position of each of the marks 66K, 66Y, 66M, and 66C based on binary signals outputted from the mark sensors 61. Then, the MFP 100 calculates the interval in the subscanning direction between the mark for each color targeted for adjustment (marks 66Y, 66M, and 66C, for example) and the mark of the reference color (mark 66K, for example). The interval between marks for the reference color and the adjustment color changes when there is registration offset in the subscanning direction. Thus, the amount of registration offset in the subscanning direction for the adjustment color relative to the reference color can be specified based on the interval between marks for the reference color and the adjustment color.

The form of the registration patterns 66 described above is merely an example, and the invention is not limited to this form. The marks formed on the conveying belt 7 in the above process may be any common image pattern that can be used for correcting registration offset and density.

Figure 5:
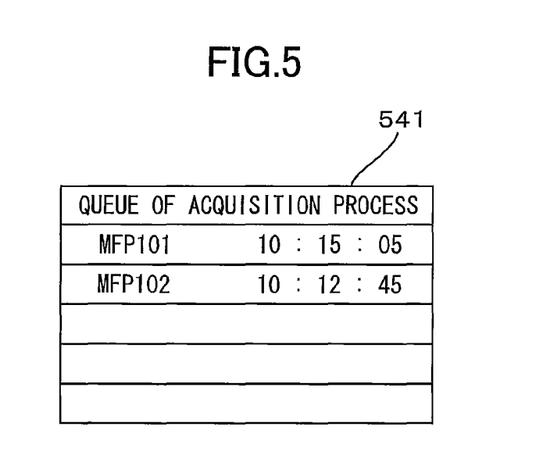
FIG. 5 is a view showing an example of databases for managing information of the MFPs which have transmitted a request to execute an acquisition process.
Figure 6:
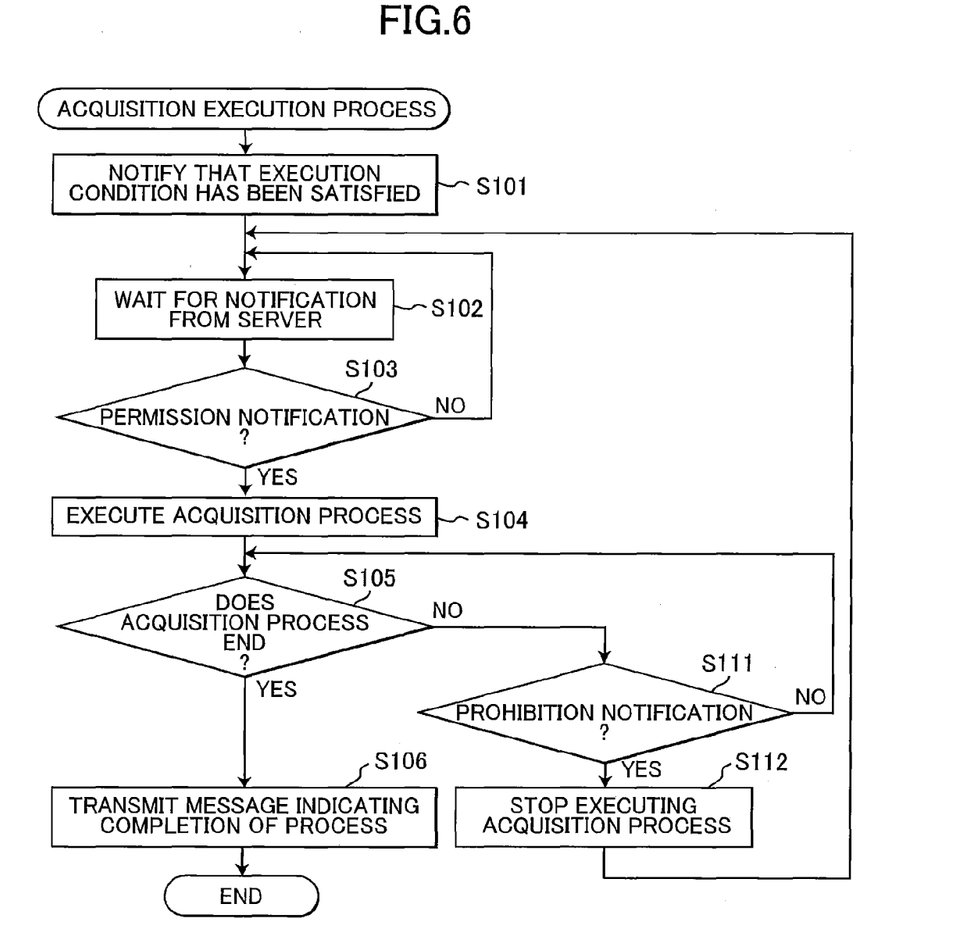
FIG. 6 is a flowchart of an acquisition execution process executed by the MFPs according to the first embodiment.
Figure 7:
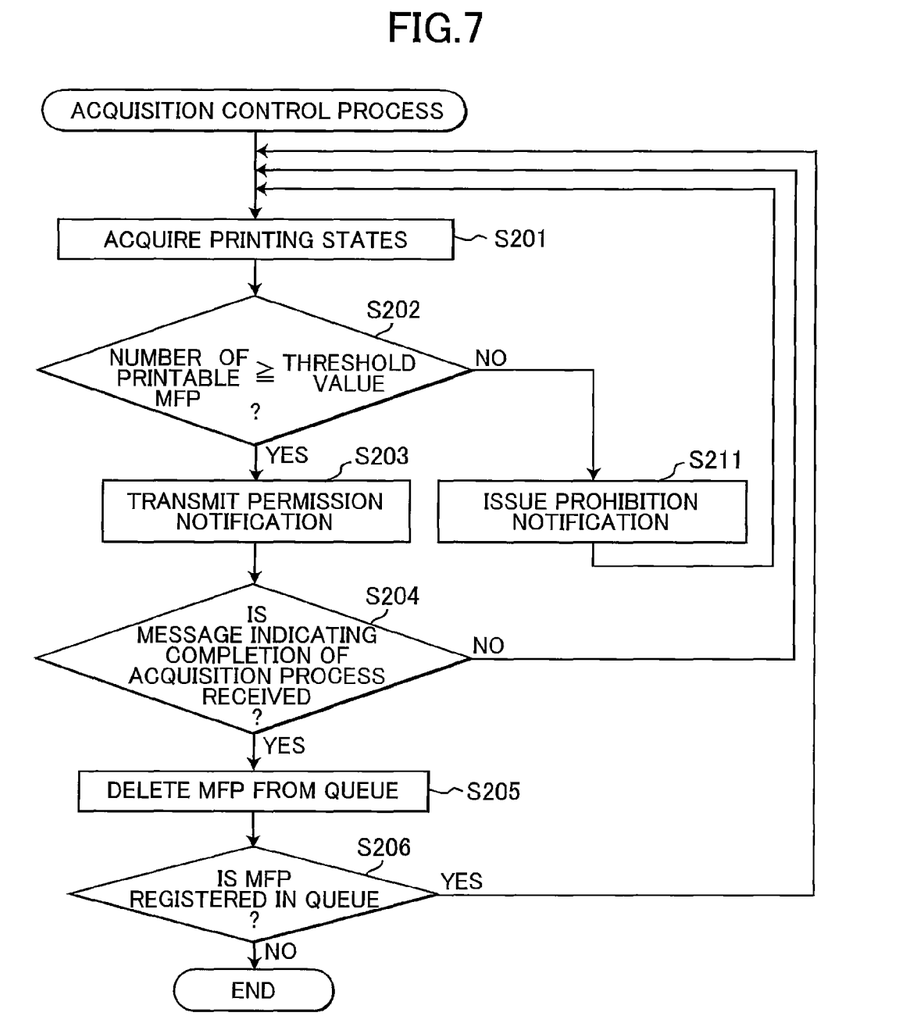
FIG. 7 is a flowchart of an acquisition control process executed by the server according to the first embodiment.

Next, an operation to control the acquisition processes executed by all the MFPs in the image-forming system 500 will be described with reference to FIGS. 5 through 7.

As described above in the acquisition process of the process to correct registration offset, there is a need to form a plurality of marks and to detect the positions of these marks. Once the acquisition process is started, the MFP cannot perform a printing operation for a prescribed time period. Consequently, if multiple MFPs belonging to the image-forming system 500 were to execute this acquisition process simultaneously, the number of MFPs that can perform a printing operation may be significantly reduced, causing great inconvenience to users. Therefore, in the image-forming system 500 according to the first embodiment, the server 200 controls the timings at which the acquisition processes are executed on the MFPs 100, 101, 102 and 103, while checking whether the MFPs 100, 101, 102, and 103 are available for performing printing operations.

Specifically, execution conditions for the acquisition process are set to the MFPs 100, 101, 102, and 103 in the RAM 33, the NVRAM 34, or the ROM 32, for example. When each of the MFPs 100, 101, 102, and 103 satisfies the execution condition for the acquisition process, each of the MFPs 100, 101, 102 and 103 asks the server 200 whether the acquisition process should be executed. Each of the MFPs 100, 101, 102 and 103 starts executing the acquisition process upon receipt of a notification from the server 200 indicating that the acquisition process is permitted to be executed. The server 200, on the other hand, prestores a queue 541, as shown in FIG. 5, for managing the MFPs which have requested execution of the acquisition process in the RAM 53. In response to the requests from each of the MFPs 100, 101, 102 and 103, the server 200 stores, in the queue 541, information of the MFPs that have transmitted the requests (such as names of the MFPs and time of registration) in such an order that the server 200 has received such requests. The server 200 then acquires information on whether each of the MFPs 100, 101, 102 and 103 belonging to the image-forming system 500 is available for performing printing operations. Depending on the information, the server 200 determines the MFP to which the permission for executing the acquisition process should be given.

Hereinafter, a process performed on the image-forming system 500 for implementing the operations to control execution of the above acquisition processes will be described as a process executed on the MFP side (the acquisition execution process) and a process executed on the server side (the acquisition control process).

The acquisition execution process executed by each of the MFPs 100, 101, 102 and 103 will be described first with reference to a flowchart of FIG. 6. The acquisition execution process is configured to be initiated each time the execution conditions are met. Explanation is given below assuming that the MFP 100 is about to execute the acquisition execution process. The MFP 101, 102, and 103 executes the acquisition execution process that is same as the acquisition execution process that is executed by the MFP 100.

First, in S101 the CPU 31 of the MFP 100 notifies the server 200 that the executing conditions predetermined for the MFP 100 have been satisfied. The CPU 31 then waits for a notification from the server 200 indicative of whether the acquisition process should be executed in S102.

Meanwhile, on the server 200 side, in response to the request from the MFP 100 made in S101, the CPU 51 of the server 200 registers information of the MFP 100 in the queue 541. The CPU 51 then determines whether to give a permission to execute the acquisition process to the MFP 100, and transmits a notification to the MFP 100 indicative of either permission or prohibition of the execution based on the determination.

When received the notification from the server 200, in S103 the CPU 31 determines whether the notification indicates permission for execution of the acquisition process (that is, whether a permission notification is received from the server 200). If the notification is not permission (S103: NO), the CPU 31 returns to S102 to wait for another notification to come from the server 200. On the other hand, if the notification indicates permission (S103: YES), in S104 the CPU 31 stars executing the acquisition process.

Subsequently, in S105 the CPU 31 determines whether the acquisition process has ended. If the acquisition process has not yet ended (S105: NO), the CPU 31 then determines in S111 whether another notification to prohibit the execution of the acquisition process has been transmitted from the server 200 after receipt of the permission notification (that is, whether a prohibition notification is received from the server 200). The MFP 100 may receive such prohibition notification even after permission was once given thereto, for example, when other MFPs have become impossible to perform printing operations due to lack of paper, mechanical troubles and the like.

When no prohibition notification is transmitted from the server 200 (S111: NO), the CPU 31 returns to S105 and waits for the acquisition process to end.

If the prohibition notification is received before the acquisition process is terminated (S111: YES), in S112 the CPU 31 stops executing the acquisition process. That is, the MFP 100 compulsorily cancels the acquisition process even in the middle of the execution thereof in order to make the MFP 100 available for printing operations. Here, the cancellation of the acquisition process may mean either a temporal suspension or an actual termination of the execution of the acquisition process. Once the acquisition process has been cancelled in S112, the CPU 31 returns to S102 and waits for another notification to come from the server 200. Upon receipt of another notification indicative of permission of the execution of the acquisition process, the CPU 31 again carries out the acquisition process. In this way, the acquisition process is allowed to be executed even the execution thereof was once cancelled.

When the acquisition process has ended without being interrupted (S105: YES), in S106 the CPU 31 transmits a message indicating that the acquisition process has completed in the MFP 100 to the server 200. The CPU 31 subsequently ends the current acquisition execution process.

The acquisition control process executed by the server 200 will be described next with reference to a flowchart of FIG. 7. This acquisition control process is configured to be initiated when any one of the MFPs 100, 101, 102 and 103 has been registered in the queue 541 in which no MFP had been registered at the time of registration.

First, in S201, the CPU 51 of the server 200 acquires printing states of each of the MFPs 100, 101, 102 and 103 belonging to the image-forming system 500. The "printing state" means either a printable state where printing can be performed, or a non-printable state where printing cannot be performed. An MFP may be in the non-printable state when the acquisition process is in progress, when a paper jam occurs, or when there is insufficient toner, for example.

The CPU 51 may acquire the printing states by asking each of the MFPs 100, 101, 102 and 103 each time the CPU 51 executes the processing of S201. Alternatively, the server 200 may store, in the RAM 53 or the HDD 54, a database for registering the printing states of each MFPs 100, 101, 102 and 103 configured of the image-forming system 500. In this case, the CPU 51 periodically asks for the printing states of respective MFPs 100, 101, 102 and 103 and stores the same in the database. The CPU 51 retrieves the printing states of each MFP from the database at the time of executing S201.

In S202, the CPU 51 then determines how many MFPs in the image-forming system 500 are in the printable states. More specifically, the CPU 51 determines whether the number of printable MFPs is larger than or equal to a prescribed threshold value. The threshold value is predetermined as a minimum number of printable MFPs necessary to ensure operability of the image-forming system 500. This threshold value may be set as a prescribed ratio of MFPs, instead of the prescribed number of MFPs.

When the number of printable MFPs is smaller than the threshold value (S202: NO), in S211 the CPU 51 transmits the prohibition notification to the MFP listed in the top of the queue 541 (i.e., to the MFP whose registration time is the oldest among the MFPs listed in the queue 541). In other words, if the number of printable MFPs is small in the image-forming system 500 as a whole, the acquisition process is not to be executed (prohibited) and the number of MFPs available for printing is maintained. Subsequently, the CPU 51 waits for a prescribed period of time and returns to S201.

On the other hand, if the number of printable MFPs is greater than or equal to the threshold value (S203: YES), in S203 the CPU 51 transmits the permission notification to the MFP listed top in the queue 541. In other words, when there are enough number of MFPs that can perform printing operations in the entire image-forming system 500, the execution of the acquisition process is to be allowed.

Subsequently, after a predetermined period of time has elapsed, in S204 the CPU 51 determines whether there comes the message indicative of the completion of the acquisition process from the MFP to which the permission notification was transmitted in S203. If the completion message has not yet been received (S204: NO), the CPU 51 returns to S201 and again acquires the printing states of all the MFPs belonging to the image-forming system 500. At this time, if some of the MFPs are turned out to be in the non-printable states and therefore the number of printable MFPs becomes smaller than the threshold value (S202: NO), in S211 the CPU 51 issues the prohibition notification to the MFP to which the permission notification was once transmitted. For example, when in the previous step S203 the CPU 51 transmits the permission notification to the MFP and the MFP is executing the acquisition process, the MFP is in the non-printable state. In this case, the number of printable MFPs is decrementd by one. On the other hand, one of the MFPs finishes the acquisition process and comes back to the printable state, the number of printable MFPs is incremented by one. That is, the number of the printable MFPs changes momentarily. So, if the number of printable MFPs is currently greater than or equal to the threshold value (S202: YES), the CPU 51 transmits the permission notification to the MFP listed top in the queue 541. On the other hand, if the number of printable MFPs is currently smaller than the threshold value (S202: NO), the CPU 51 transmits the prohibition notification to the MFP listed top in the queue 541. For example, if the MFP listed top in the queue 541 is currently executing the acquisition process, and if the number of printable MFPs is currently smaller than the threshold value (S202: NO), the CPU 51 stops the acquisition process of the MFP listed top in the queue 541 by transmitting the prohibition notification.

If the CPU 51 received the completion message (S204: YES), in S205 the CPU 51 deletes, from the queue 541, the MFP from which the completion message was transmitted (i.e., the CPU 51 deletes the information of the MFP listed at the top of the queue 541).

The CPU 51 then determines in S206 whether any other MFP has been registered in the queue 541. That is, the CPU 51 determines whether there exists any other MFP that has been newly added in the queue 541 while the acquisition process was executed by the MFP previously listed on the top of the queue 541. If any new MFP has been registered (S206: YES), the CPU 51 returns to S201 and determines whether the newly-registered MFP should execute the acquisition process. If no MFP has been added in the queue 541 (S206: NO), the CPU 51 ends the current acquisition control process.

As described above, in the image-forming system 500 according to the first embodiment of the invention, the server 200 acquires the printing states of each of the MFPs 100, 101, 102 and 103, and prohibits the acquisition process from being executed in the MFPs that have satisfied the execution conditions unless the number of printable MFPs is greater than or equal to the threshold value. In other words, for each MFP in the image-forming system 500, the execution of the acquisition process is subject to prohibition depending on the printing states of other MFPs belonging to the same image-forming system 500. With this configuration, the acquisition process is prevented from being executed if there are insufficient number of MFPs available for printing in the image-forming system 500.

Further, in the acquisition control process executed in the server 200, the server 200 continues to monitor the printing states of each MFP even after the prohibition notification was once given to the MFP registered at the top of the queue 541. The server 200 gives the permission for execution of the acquisition process to the top-listed MFP immediately after the number of printable MFPs becomes greater than or equal to the threshold value. With this configuration, each MFP in the image-forming system 500 can promptly complete the acquisition process.

Further, in the acquisition control process executed in the server 200, the server 200 allows the acquisition process to be executed based on the order of registration of the MFPs in the queue 541. This configuration can suppress occurrence of situations where a particular MFP cannot perform printing for a long period of time. Further, since giving permission to a plurality of MFPs for executing the acquisition process inevitably leads to an increase in the number of the non-printable MFPs, the server 200 issues permission to execute the acquisition process to only one MFP at a time in accordance with the order of the MFPs listed in the queue 541 in the acquisition control process according to the first embodiment. This configuration can prevent sharp reduction of the number of printable MFPs.

Second Embodiment

Figure 8:
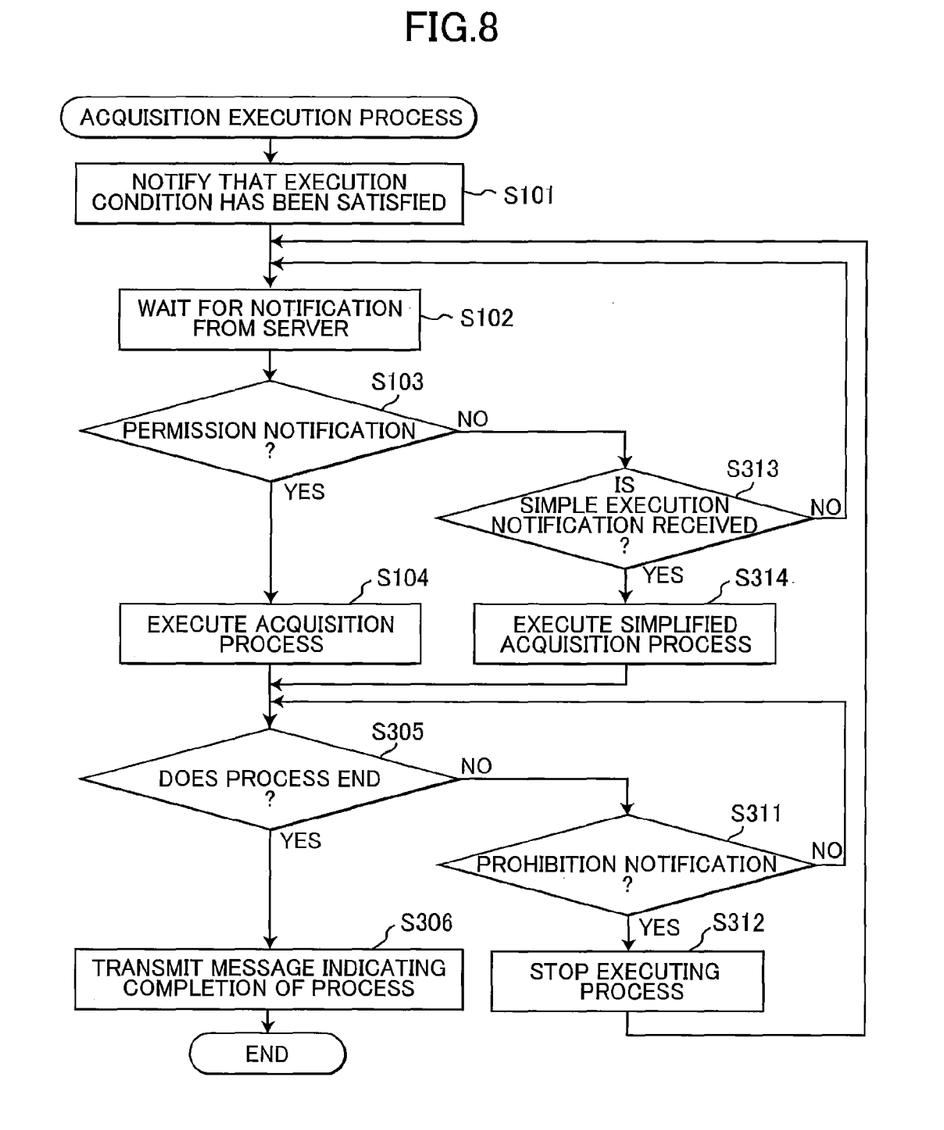
FIG. 8 is a flowchart of an acquisition execution process executed by the MFPs according to a second embodiment of the invention.

Next, an acquisition execution process executed by MFPs according to a second embodiment will be described with reference to a flowchart of FIG. 8. In FIG. 8, processes identical to those of the first embodiment are designated by the same reference numerals to avoid duplicating description. Further, an image-forming system according to the second embodiment is identical to the image-forming system 500 of the first embodiment.

In the second embodiment, the MFPs are allowed to execute a simplified acquisition process in addition to the acquisition process of the first embodiment. In the simplified acquisition process, the MFPs can acquire the amount of offset for the registration correction in a shorter time than in the acquisition process. For example, the number of marks (or. the number of registration patterns 66) is fewer in the simplified acquisition process than in the acquisition process. As another alternative, the amounts of offset for correcting the position and densities of the image are both configured to be obtained in the acquisition process. In this case, as the simplified acquisition process, either one of the two amounts of offset may be acquired.

In the second embodiment, the server 200 can issue a notification indicative of permission for executing the simplified acquisition process (to be referred to as a "simple execution notification"), in addition to the permission notification and prohibition notification of the first embodiment. The server 200 decides which notification to be issued based on the number of printable MFPs.

More specifically, in the second embodiment, the server 200 has prestored a second threshold value in addition to the threshold value. The second threshold value is smaller than the threshold value. Upon determination in S202, if the number of printable MFPs is smaller than the threshold value but greater than or equal to the second threshold value, the server 200 issues the simple execution notification. If the number of printable MFPs is smaller than the second threshold value, the server 200 notifies prohibition of the execution of the simplified acquisition process. If the number of printable MFPs is greater than or equal to the threshold value, the server 200 notifies permission to execute the acquisition process.

Referring to FIG. 8, in the acquisition execution process of the second embodiment, after waiting for any notification to come from the server 200 in S102, the CPU 31 determines in S103 whether the permission notification has been received from the server 200 as in the first embodiment. If the permission notification has not been received (S103: NO), the CPU 31 then determines in S313 whether the simple execution notification has been received. If the simple execution notification has not been received (S313: NO), the CPU 31 returns to S102. On the other hand, if the simple execution notification has been received (S313: YES), the CPU 31 starts executing the simplified acquisition process in S314 and proceeds to S105. In S305, the CPU 31 determines whether the process executed in S104 (acquisition process) or S314 (simplified acquisition process) is ended. If a negative determination is made (S105: NO), in S311 the CPU 31 determines whether the prohibition notification is received from the server. If a positive determination is made (S311: YES), in S312 the CPU 31 stops currently executing process (the acquisition process or the simplified acquisition process). If a negative determination is made (S312: NO), the CPU 31 returns to S305. In S306 the CPU 31 transmits a message indicating that the process (the acquisition process or the simplified acquisition process) has completed to the server 200.

In the second embodiment, the MFPs are allowed to have a further option to adopt the simplified acquisition process depending on the availability of the printable MFPs in the image-forming system 500. In the simplified acquisition process, the correction amounts can be acquired in a shorter period of time than in the acquisition process. Therefore, the period of time during which printing operations cannot be performed can be made shorter in the second embodiment. At the same time, executing the simplified acquisition process can achieve a certain level of correction amounts to be obtained, although accuracy of the obtained amounts may be lower than that acquired in the acquisition process. Therefore, improvement in the image quality can also be expected. In other words, in the second embodiment, productivity decline can be suppressed, while quality improvement can be realized simultaneously.

Third Embodiment

Next, a configuration of an image-forming system 600 according to a third embodiment of the invention will be described with reference to FIG. 9.

Figure 9:
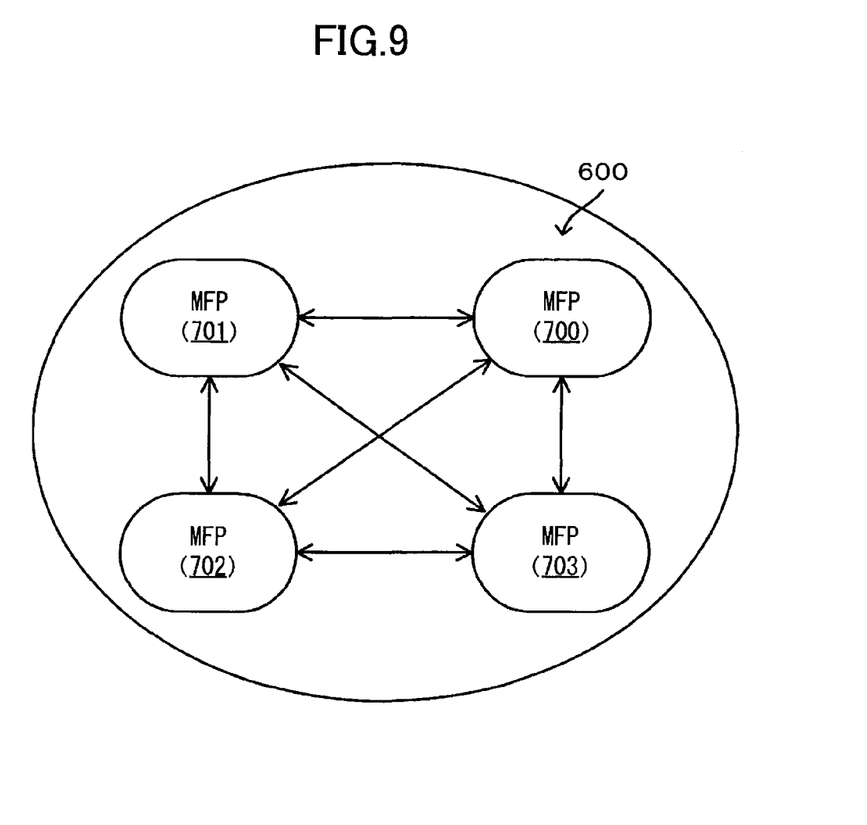
FIG. 9 is a block diagram showing a configuration of an image-forming system according to a third embodiment of the invention.

As shown in FIG. 9, the image-forming system 600 is configured of MFPs 700, 701, 702 and 703, each of which is communicably connected to one another. However, the image-forming system 600 does not include a server unlike in the first and second embodiments. The configuration of the MFPs 700, 701, 702, and 703 are basically identical to the configuration of the MFPs 100, 101, 102, and 103. In the third embodiment, each MFP monitors the printing states of other MFPs to determine whether to execute the acquisition process in the monitoring MFP itself.

In the third embodiment, each of the MFP 700, 701, 702 and 703 is provided with an execution section for executing the acquisition execution process, and a control section for executing the acquisition control process (executed by server 200 in the first and second embodiments). In other words, the each MFP is given a function of the server 200.

For example, when the execution conditions are met in the MFP 700, the execution section of the MFP 700 asks the control section of the MFP 700 whether the acquisition process should be executed in the MFP 700. In response, the control section of the MFP 700 obtains the printing states of other MFPs 701, 702 and 703, and determines whether to execute the acquisition process in the MFP 700. The control section of the MFP 700 then notifies the execution unit of the MFP 700 of the determination result. The execution section of the MFP 700 prohibits execution of the acquisition process when received the prohibition notification from the control section of the MFP 700, while starts executing the acquisition process when received the permission notification.

In this way, in the third embodiment, since each of the MFPs in the image-forming system 600 is provided with a server function, each MFP can directly obtain the printing states of other MFPs. Therefore, each MFP can determine its own timing to execute the acquisition process in accordance with the printing states of other MFPs belonging to the same image-forming system 600.

As described above, in the image-forming system 500 or 600, when the execution conditions are satisfied in a particular MFP, a restriction on execution of the acquisition process can be placed on the particular MFP in consideration of the printing states of other MFPs in the same image-forming system 500 or 600. For example, if there is no other printable MFP other than the particular MFP, the particular MFP is prevented from executing the acquisition process and maintains its printable state. This configuration can prevent such an inconvenience that there are no printable MFPs in the image-forming system 500 or 600.

While the invention has been described in detail with reference to the embodiments thereof, it would be apparent to those skilled in the art that various changes and modifications may be made therein without departing from the spirit of the invention. For example, the invention may also be applied to an image forming device other than MFP, such as a printer and a copier, provided that the device is provided with a printing function.

Further, while the invention is applied to MFPs having color printing functions in the embodiments described above; the image-forming device according to the invention is not limited to a color printing device. For example, the invention may be applied to a monochrome printing device, provided that the device forms marks used to correct registration error, density, and the like.

While the registration patterns 66 in the above embodiments are formed of bar-shaped marks, the configuration of the registration patterns 66 is not limited to this shape. For example, the registration pattern 66 may be configured of pairs of bar-shaped marks, with at least one mark in the pair sloped at a prescribed angle to the main scanning direction. Using this registration pattern 66, registration errors in the main scanning direction as well as in the subscanning direction can be detected.

Further, the above embodiments describe registration patterns formed as marks on the conveying belt 7 for correcting registration. However, the invention may also be applied to density patterns used to correct irregularities in density, for example. In order to acquire a density correction amount, the MFP forms several marks of varying densities on the conveying belt 7 in each color and detects the amount of light reflected off the marks with the same sensors used for detecting registration errors or with separate photosensors. The MFP detects the density from the intensity of reflected light and calculates the difference between the detected density and the desired density.

Further, in the above embodiments, the invention is applied to MFPs that form marks on a paper-conveying belt. However, the invention may also be applied to an image-forming device having an intermediate transfer belt, whereby the image-forming device forms marks (patterns) on this intermediate transfer belt.

In the above-described embodiments, the printing states of all the MFPs belonging to the in the image-forming system 500 or 600 are obtained. However, the printing states of all the MFPs may not necessarily be obtained. For example, one MFP may ask for the printing states of a prescribed number of MFPs. In this case, among the predetermined number of MFPs, if the number of printable MFPs is turned out to be smaller than a predetermined value, the MFP may request the printing states of other remaining MFPs.

Further, while the server 200 is provided for managing the MFPs 100, 101, 102 and 103 in the first and second embodiments, one of the MFPs 100, 101, 102, and 103 may be provided with a server function.

Further, in the first and second embodiments, only one of the MFPs listed top of the queue 541 is notified of the prohibition of the execution of the acquisition process when the number of printable MFPs is smaller than the threshold value (S202: NO). However, the prohibition notification may instead be issued to all the MFPs registered in the queue 541.

What is claimed is:

1. An image-forming system comprising:
   a plurality of image-forming devices connected in a network, each image-forming device being selectively capable of performing a test print process to form a test image and an image print process to form an image based on image data;
   a first determining unit that is configured to determine whether at least one image-forming device among the plurality of image-forming devices is capable of performing the image print process;
   a second determining unit that is configured to determine whether to restrict an image-forming device among the plurality of image-forming devices to execute the test print process based on a result of determination by the first determining unit; and
   a restricting unit that is configured to restrict the image-forming device to execute the test print process when the second determining unit determines to restrict the image-forming device to execute the test print process,
   wherein the second determining unit is configured to determine to restrict the image-forming device based on number of the image-forming devices capable of printing is less than a threshold value.

2. The image-forming system according to claim 1, wherein the restricting unit is configured to end a restriction of the execution of the test print process with respect to the image-forming device and configured to prompt the image-forming device to execute the test print process.

3. The image-forming system according to claim 2, wherein each of the plurality of image-forming devices is set to an execution condition that defines a condition to execute the test print process,
   wherein when the image-forming device satisfies the execution condition and when the restricting unit ends a restriction of the execution of the test print process with respect to the image-forming device and prompts the image-forming device to execute the test print process, the image-forming device executes the test print process.

4. The image-forming system according to claim 3, wherein when two or more image-forming devices among the plurality of image-forming devices satisfy the executing conditions and when the restricting unit ends the restriction of the execution of the test print process with respect to the image-forming device and prompt the image-forming device to execute the test print process, each of the two or more image-forming devices executes the test print process according to an order in which the two or more image-forming devices have satisfied the execution conditions.

5. The image-forming system according to claim 1, wherein when the second determining unit determines to restrict an image-forming device that is currently executing the test print process to execute the test print process, the restricting unit stops the test print process of the image-forming device that is currently executing the test print process.

6. The image-forming system according to claim 1, each image-forming device forms a mark to detect positional offset or density offset in the test image in the test print process.

7. The image-forming system according to claim 1, further comprising a server that is connected to the plurality of image-forming devices, the server including the first determining unit, the second determining unit, and the restricting unit.

8. The image-forming system according to claim 1, wherein one of the plurality of image-forming devices includes the first determining unit, the second determining unit, and the restricting unit.

9. An image-forming device comprising:
   an executing unit that is selectively capable of performing a test print process to form a test image and an image print process to form an image based on image data;
   a first determining unit that is configured to determine whether at least one image-forming device among a plurality of external image-forming devices is capable of performing an image print process;
   a second determining unit that is configured to determine whether to restrict the executing unit to execute the test print process based on a number of the external image-forming devices that is determined to be capable of printing by the first determining unit is less than a threshold value; and
   a restricting unit that is configured to restrict the executing unit to execute the test print process when the second determining unit determines to restrict the executing unit to execute the test print process.

* * * * *